United States Patent
Yu et al.

(10) Patent No.: US 9,258,790 B2
(45) Date of Patent: Feb. 9, 2016

(54) DYNAMIC POWER SPECTRUM MANAGEMENT METHOD, SPECTRUM OPTIMIZATION SYSTEM AND CLIENT DEVICE

(75) Inventors: W Yu, Toronto (CA); J Yuan, Ottawa (CA); Liming Fang, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2326 days.

(21) Appl. No.: 11/945,338

(22) Filed: Nov. 27, 2007

(65) Prior Publication Data
US 2008/0123776 A1 May 29, 2008

(30) Foreign Application Priority Data

Nov. 27, 2006 (CN) .......................... 2006 1 0149051
Jan. 16, 2007 (CN) .......................... 2007 1 0000242

(51) Int. Cl.
*H04B 3/20* (2006.01)
*H04W 52/34* (2009.01)
(Continued)

(52) U.S. Cl.
CPC ............... *H04W 52/346* (2013.01); *H04B 3/32* (2013.01); *H04L 1/0001* (2013.01); *H04L 5/006* (2013.01);
(Continued)

(58) Field of Classification Search
CPC ... H04L 5/0021; H04L 5/0007; H04L 5/0029; H04L 5/0035; H04L 5/0037; H04L 5/0039; H04L 5/0046; H04L 5/006; H04L 5/0064; H04L 5/0073; H04L 5/0094; H04L 1/0002; H04L 1/0003; H04L 1/0021; H04L 27/0008; H04L 27/2601; H04L 27/2602; H04L 27/2608; H04L 27/2614; H04L 45/24; H04L 47/10; H04B 7/022; H04B 7/026; H04B 7/0417; H04B 7/0443; H04B 7/0452; H04B 7/0456; H04B 7/0615; H04B 7/0617; H04B 7/0632; H04B 7/0842; H04B 7/2628; H04W 52/40; H04W 52/42; H04W 52/50; H04W 72/046; H04W 72/1231; H04W 84/18
USPC .......... 370/352, 299, 286, 219; 455/522, 67 X
See application file for complete search history.

(56) References Cited

U.S. PATENT DOCUMENTS

2005/0220178 A1 * 10/2005 Ginis ............................ 375/219

FOREIGN PATENT DOCUMENTS

| CN | 1578186 | 2/2005 |
|---|---|---|
| CN | 1835425 | 9/2006 |

OTHER PUBLICATIONS

Raphael Cendrillon, et al; "Optimal Multi-user Spectrum Management for Digital Subscriber Lines", IEEE Communications Society; Dec. 31, 2004, pp. 1-5.

(Continued)

*Primary Examiner* — Khaled Kassim
(74) *Attorney, Agent, or Firm* — Conley Rose, P.C.; Grant Rodolph

(57) ABSTRACT

The present invention provides a dynamic power spectrum management method, a spectrum optimization system, and a client device, which can improve spectrum management. The method includes: calculating, from a tax factor containing user crosstalk information, a water-filling parameter corresponding to the case that total power of each user is below or equal to a threshold of total power of the user; calculating, from the water-filling parameter, power allocated to each user in each sub-carrier until convergence is attained for all users. Correspondingly, the present invention further provides a spectrum optimization system and a client device. In effect, the present invention can improve the spectrum management.

14 Claims, 3 Drawing Sheets

(51) Int. Cl.
*H04B 3/32* (2006.01)
*H04L 1/00* (2006.01)
*H04L 5/00* (2006.01)

(52) U.S. Cl.
CPC ............ *H04L 5/0044* (2013.01); *H04L 5/0062* (2013.01); *H04L 5/0007* (2013.01); *H04L 5/0037* (2013.01)

(56) References Cited

OTHER PUBLICATIONS

International Search Report mailed Mar. 6, 2008, PCT/CN2007/071135.
Foreign Communication From a Related Counterpart Application, European Application No. 07022971.1, Summons to Attend Oral Proceedings dated Dec. 13, 2011, 5 pages.
English Translation of Written Opinion of the International Search Authority.
First Office Action regarding European Counterpart Application of U.S. Appl. No. 11/945,338.
John Papandriopoulos, et al; "Low-Complexity Distributed Algorithms for Spectrum Balancing in Multi-User DSL Networks", XP-031025574, IEEE ICC 2006 proceedings.
Wei Yu, et al; "Distributed Multiuser Power Control for Digital Subscriber Lines", IEEE Journal on Selected Areas in Communications, vol. 20, No. 5, Jun. 2002, pp. 1105-1115.
European Search Report dated Apr. 28, 2008; Application No./Patent No. 07022971.1-1525.
First Office Action regarding Chinese Priority Application No. 200710000242.0 and a Partial Translation.
Foreign Communication From a Related Counterpart Application, Chinese Application 200780000595.9, Chinese Office Action dated Nov. 30, 2011, 8 pages.
Foreign Communication From a Related Counterpart Application, Chinese Application 200780000595.9, Partial Translation of Chinese Office Action dated Nov. 30, 2011, 9 pages.

* cited by examiner

DYNAMIC POWER SPECTRUM MANAGEMENT METHOD, SPECTRUM OPTIMIZATION SYSTEM AND CLIENT DEVICE

CROSS-REFERENCE TO RELATED APPLICATION

This application claims priorities from Chinese Patent Application No. 200610149051.6 filed on Nov. 27, 2006, entitled "DYNAMIC POWER SPECTRUM MANAGEMENT METHOD, SPECTRUM OPTIMIZATION SYSTEM AND CLIENT DEVICE", and Chinese Patent Application No. 200710000242.0 filed on Jan. 16, 2007, entitled "DYNAMIC POWER SPECTRUM MANAGEMENT METHOD, SPECTRUM OPTIMIZATION SYSTEM AND CLIENT DEVICE", which are incorporated herein by reference in their entirety.

FIELD OF THE INVENTION

The present invention relates to the field of communications, and in particular to a dynamic power spectrum management method, a spectrum optimization system, and a client device.

BACKGROUND OF THE INVENTION

The technology of Digital Subscriber Line (DSL) is a high speed transmission technology in which data is transmitted through a twist pair which is designed for voice transmission, i.e. Unshielded Twist Pair (UDP). The DSL includes the Asymmetrical Digital Subscriber Line (ADSL), the Very-high-bit-rate Digital Subscriber Line (VDSL), the Digital Subscriber Line (IDSL) based upon the Integrated Services Digital Network (ISDN), and the Single-pair High-bit-rate Digital Subscriber Line (SHDSL), etc.

Figure 1:
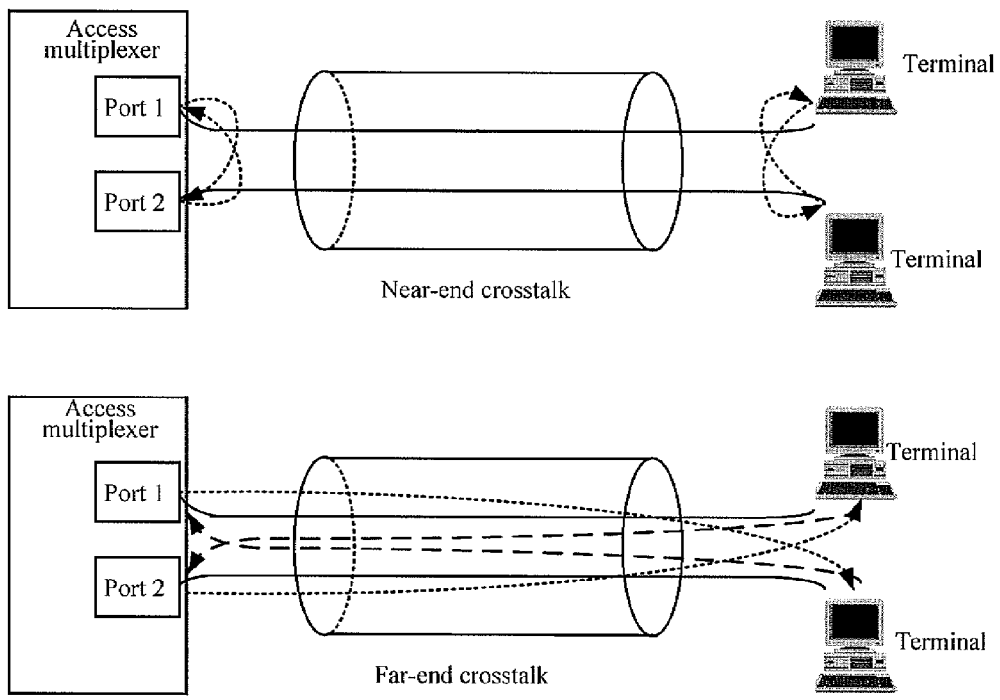

With the increase of frequency bands used for the various digital subscriber line technologies (xDSL), the issue of crosstalk, especially the issue of crosstalk in high frequency bands becomes apparent more and more. As illustrated in FIG. 1, since the frequency division multiplexing is adopted in downlink and uplink channels of xDSL, the near-end crosstalk (NEXT) will not cause much damage to the performance of a system, but the far-end crosstalk (FEXT) will influence the transmission performance of the lines severely. When a plurality of users out of a bundle of cables require fulfillment of an xDSL service, some lines will be of low rate and unstable performance, and even not be fulfilled with required services due to the far-end crosstalk, which ultimately leads to a low line activation ratio of a DSLAM (Digital Subscriber Line Access Multiplexer).

In a communication model in which Discrete Multi-Tone Modulation (DMT) is adopted and K users and N Tones are included, the signal transmission over each Tone can be expressed independently as follows:

$$y_n = H_n x_n + \sigma_n$$

Normally, the receiving end of each xDSL modem takes interference from other modems as noise, and the data rate achieved by the $k^{th}$ user over the $n^{th}$ Tone can be calculated with the Shannon channel capacity formula as follows:

$$b_n^k = \log_2\left(1 + \frac{|h_n^{k,k}|^2 s_n^k}{\sum_{j \neq k} |h_n^{k,j}|^2 s_n^j + \sigma^k}\right)$$

As can be seen from the above formula, the crosstalk will bring a serious influence upon the transmission capacity of a line, that is, reduce the line rate.

The Dynamic Spectrum Management (DSM) can be used to reduce the influence of the crosstalk. Specifically, the DSM is intended to reduce the crosstalk by automatically adjusting transmission power over each modem in a network. Particularly in the case of a CO/RT hybrid application, the influence of the crosstalk of a short line upon a long line may be more serious. The object of the DSM is to adjust the transmission power for each modem to achieve a balance between maximizing its rate and reducing influence of its crosstalk upon other modems.

The goal of the DSM is that in the case of total transmission power of each user not exceeding a threshold, value of transmission power of each user in each sub-carrier is adjusted so as to maximize a weighted rate sum of all the users. Consequently, the DSM solution can be expressed mathematically as follows:

$$\text{Maximize} \sum_{k=1}^{K} \omega_k \sum_{n=1}^{N} b_n^k$$

$$\text{Subject to} \sum_{n=1}^{N} S_n^k \leq P^k, \forall k$$

$$0 \leq S_n^k \ \forall k, n$$

$S_n^k$ denotes the power allocated to the $k^{th}$ user in the $n^{th}$ sub-carrier;

$G_n^{kk}$ denotes a transmission coefficient of the $k^{th}$ subscriber line in the $n^{th}$ sub-carrier;

$G_n^{kj}(j \neq k)$ denotes a crosstalk coefficient of the $j^{th}$ user in the $n^{th}$ sub-carrier with respect to the $k^{th}$ user;

$P^k$ denotes a total power threshold of the $k^{th}$ user;

$\omega_k$ denotes a rate weight coefficient of the $k^{th}$ user;

$\sigma^2$ denotes noise power;

N denotes the total number of sub-carriers;

K denotes the total number of users.

This solution is a nonlinear constraint optimization solution, in which both the objective function and the constraint condition are non-convex functions of independent variables. Therefore, there is no efficient and complete solution algorithm. Among existing algorithms, OSB (Optimal Spectrum Balancing) and ISB (Iterative Spectrum Balancing) are the most popular ones. These two algorithms each change the original nonlinear constraint optimization problem to a nonlinear unconstraint optimization problem through an introduction of a Lagrange Multiplier. Thus, the above formula is converted into the follows:

$$\max \sum_{k=1}^{K} \omega_k \sum_{n=1}^{N} b_n^k + \sum_{k=1}^{K} \lambda_k \left(P^k - \sum_{n=1}^{N} S_n^k\right)$$

$\lambda_k$ is a Lagrange Multiplier, and the term $$\sum_{k=1}^{K} \lambda_k \left(P^k - \sum_{n=1}^{N} S_n^k\right)$$

indicates a total power constraint $$\left(\sum_{n=1}^{N} S_n^k \leq P^k, \forall k\right).$$

Since $P^k$ is a constant, the above formula is equivalent to the follows:

$$\max \sum_{k=1}^{K} \omega_k \sum_{n=1}^{N} b_n^k - \sum_{k=1}^{K} \lambda_k \sum_{n=1}^{N} S_n^k$$

Thus, it will be sufficient to solve the above formula.

A method for implementing the DSM in the prior art is an Iterative Water-Filling (IWF) algorithm.

This is a greedy algorithm, which only takes into account the influence of $s_n^k$ upon the rate over the $k^{th}$ subscribe line, and if a current subscriber line is not of the $k^{th}$ user, it is assumed that $w_j=0, \lambda_j=0, \forall j \neq k$. In this way, $J_n$ can be actually simplified as $J_n \approx J_n^k \approx w_k b_n^k - \lambda_k s_n^k$, because at this time, $w_j=0$, $\lambda_j=0, \forall j \neq k$ and $s_n^j (j \neq k)$ is fixed. For a solution of $s_n^k = \arg\max J_n^k$, because there is a unique extremum point for $J_n^k = W_k b_n^k - \lambda_k s_n^k$, a solution expression can be derived for the extremum point. The entire algorithm can be iterated continuously in order to solve $\max J_n^k$ for users over respective Tones until power allocation for all the users does not vary.

The IWF algorithm is less complicated, and can be applicable with relatively large N and K. Moreover, the algorithm is autonomic completely, i.e., users only need to optimize their rates and satisfy their power constraints respectively, and no exchange of data and information between different users or no central manager is needed. Therefore the algorithm can be readily implemented in a real system. However, the IWF is a greedy algorithm, and depends on an initial solution, so it can not ensure an optimal solution or an approximately optimal solution.

SUMMARY OF THE INVENTION

The invention is to provide a dynamic power spectrum management method, a spectrum optimization system, and a client device, by the use of which an approximately optimal solution for spectrum optimization can be obtained, and thus spectrum management efficiency is improved.

The dynamic power spectrum management method according to an embodiment of the invention includes: calculating, from a tax factor bearing user crosstalk information, a water-filling parameter of each user corresponding to the case that total power of the user is below or equal to a total power threshold of the user; calculating, from the water-filling parameter, power allocated to each user in each sub-carrier.

A spectrum optimization system according to an embodiment of the invention includes a spectrum maintenance center, a digital subscriber line access multiplexer, and a client device, wherein the spectrum maintenance center is used to set a tax factor bearing user crosstalk information, and to send the tax factor to the digital subscriber line access multiplexer; the digital subscriber line access multiplexer is used to calculate, from the tax factor containing user crosstalk information, a water-filling parameter corresponding to the case that total power of each user is below or equal to a total power threshold of the user, and to calculate, from the water-filling parameter, power allocated to each user in sub-carrier until convergence is reached; or the spectrum management center is used to set a tax factor containing user crosstalk information, and to send the tax factor to the digital subscriber line access multiplexer; the digital subscriber line access multiplexer is used to re-transmit the tax factor to the client device; the client device is used to calculate, from the tax factor containing user crosstalk information, a water-filling parameter corresponding to the case that total power of each user is below or equal to a total power threshold of the user, and to calculate, from the water-filling parameter, power allocated to each user in each sub-carrier until convergence is reached.

A client device according to an embodiment of the present invention includes a tax factor reception unit, a water-filling unit, and a transmission unit, wherein the tax factor reception unit is used to receive a tax factor containing user crosstalk information, and to send the received tax factor to the water-filling unit; the water-filling unit is used to calculate, from the received tax factor, a water-filling parameter that corresponds to the case that the total power of each user is below or equal to a total power threshold for that user, to calculate, from the water-filling parameter, power allocated to each user in each sub-carrier, and to send a calculation result to the transmission unit; the transmission unit is used to transmit the calculation result to the spectrum management center.

It can be seen from the above technical solutions that embodiments of the present invention can achieve the following advantageous effects:

In the power spectrum management of embodiments of the present invention, power allocations for each user in each sub-carrier are calculated concurrently, and thus both the influence of the crosstalk from other users upon the user and the influence of its crosstalk upon the other users are taken into account, and further, it is possible to find a local optimal solution for the spectrum optimization, which results in improvement of efficiency of the power spectrum management.

BRIEF DESCRIPTIONS OF THE DRAWINGS

Figure 2:
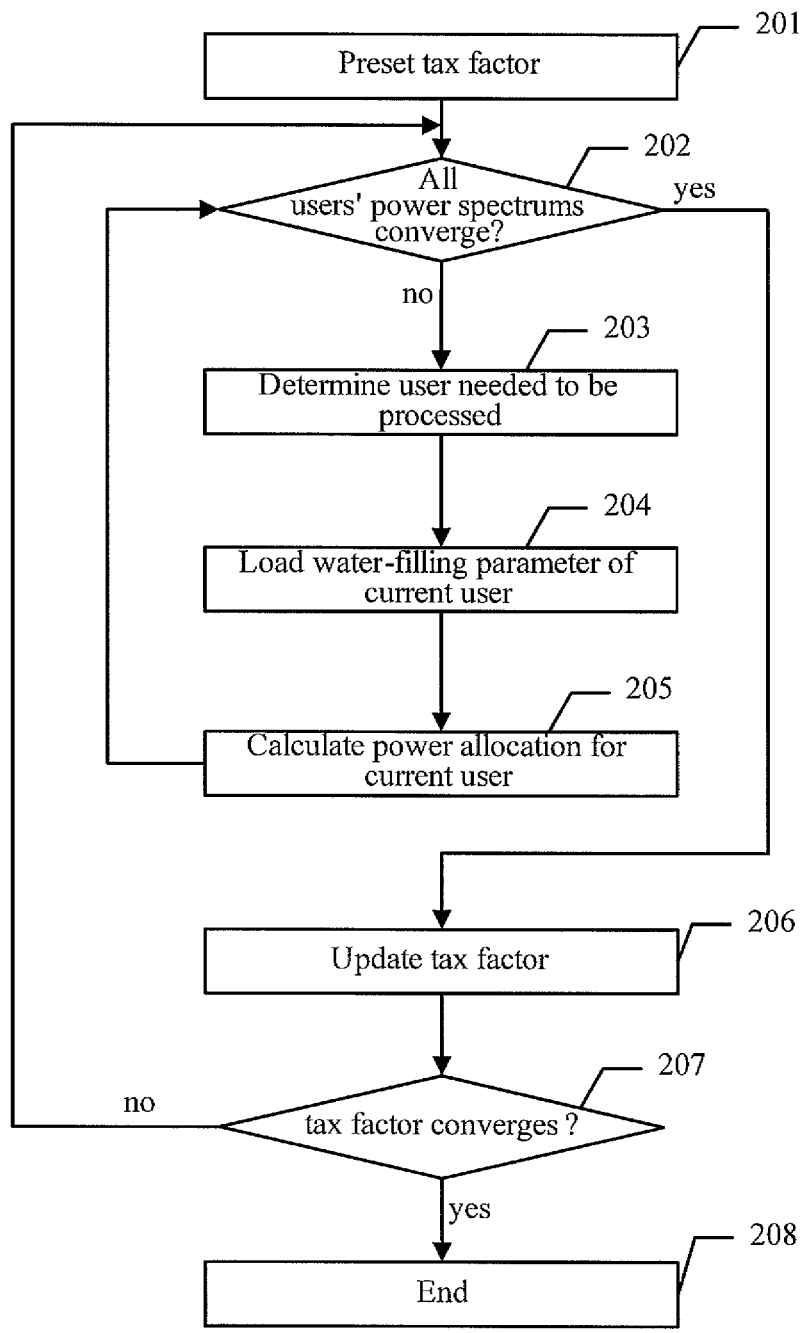
Figure 3:
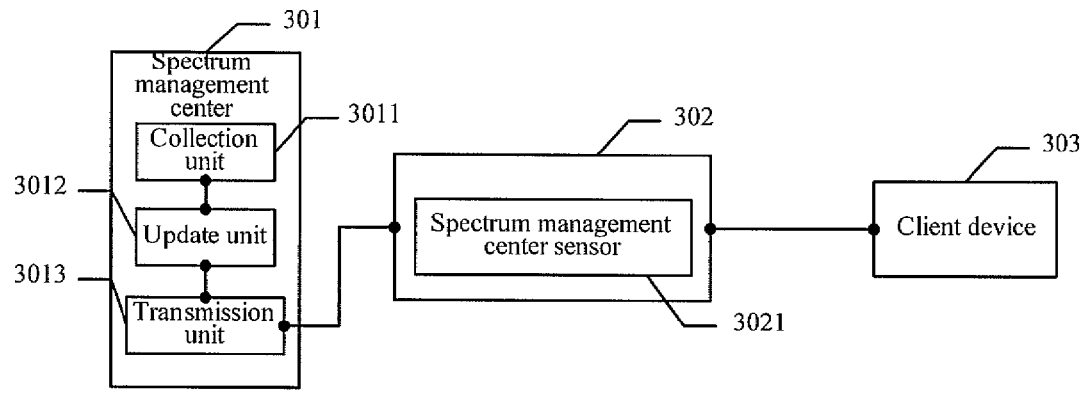
Figure 4:
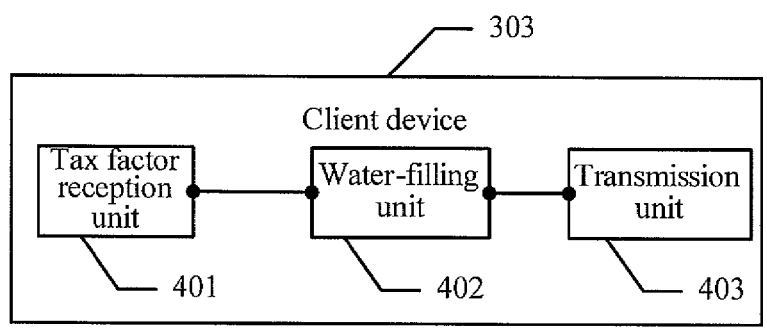

FIG. 1 is a schematic diagram illustrating crosstalk;
FIG. 2 is a flow chart of a method according to an embodiment of the present invention;
FIG. 3 is a schematic diagram of a system according to an embodiment of the present invention;
FIG. 4 is a schematic diagram of a client device according to an embodiment of the present invention.

DETAILED DESCRIPTIONS OF THE EMBODIMENTS

Embodiments of the present invention provide a dynamic power spectrum management method, a spectrum optimization system, and a client device, which are used to improve effects of spectrum management.

With reference to FIG. 2, a flow of the method according to an embodiment of the present invention includes:

201: Preset a tax factor, and initialize power spectrums of all users.

A spectrum management center sets randomly a tax factor that satisfies a preset condition, and sends the tax factor to a DSLAM.

The preset condition can be determined according to a practical situation, and in this embodiment, it is non-negative.

In the DSLAM, each user is provided with a preset original power spectrum, and these original power spectrums need to be initialized when the tax factor is preset.

202: Determine whether the power spectrums of all the users have converged, and if so, go to step 207, otherwise go to step 203.

203: Determine a user to be processed.

If this step is performed for the first time, the user to be processed is a first user, otherwise the user to be processed is a user next to the current user.

If the current user is the $K^{th}$ user (i.e. the last user), the next user is the first user.

204: Load water-filling parameters corresponding to the current user.

The water-filling parameters include a tax factor, a crosstalk item, and other parameters necessary for calculation.

The crosstalk item can be measured directly at a user end (the crosstalk item will vary with power spectrum of other users), or can be calculated from formula (5) below.

205: Calculate power allocation for the current user.

Prior to the calculation of the power allocation, a formula calculation will be performed, the specific steps thereof are as follows:

The multi-user spectrum optimization is to maximize weighted rate sum of all the users by respectively adjusting transmission power value of each user in each sub-carrier in the case that total transmission power of each user does not exceed a threshold. The multi-user spectrum optimization can be expressed mathematically as follows:

$$\text{Maximize} \sum_{k=1}^{K} \omega_k \sum_{n=1}^{N} \log\left(1 + \frac{G_n^{kk} S_n^k}{I_n^k + \sigma^2}\right) \quad \text{(Formula 1)}$$

$$\text{Subject to} \sum_{n=1}^{N} S_n^k \leq P_k, \forall k$$

$$0 \leq S_n^k \ \forall k, n$$

$S_n^k$ denotes the power allocation for $k^{th}$ user in $n^{th}$ sub-carrier;

$G_n^{kk}$ denotes $|H_n^{kk}|^2/\Gamma$, $H_n^{kk}$ denotes the channel transfer function for allocation for $k^{th}$ user in $n^{th}$ carrier. $\Gamma$ is an appropriate capacity which depends on the choice of coding and probability of symbol error.

$I_n^k$ denotes the interference for $k^{th}$ user in $n^{th}$ sub-carrier;

$P^k$ denotes a threshold constraint of total power of the $k^{th}$ user;

$\omega_k$ denotes the relative rate weight coefficient of the $k^{th}$ user;

$\sigma^2$ denotes the common background noise PSD;

N denotes total number of sub-carriers;

K denotes total number of the users.

The magnitude of the crosstalk suffered by each user, $I_n^k$, is not only dependent upon the power of other users in the current sub-carrier, but also may be dependent upon the power of other users in an adjacent sub-carrier (in the case of an unsynchronized system). Specifically:

$$I_n^k = \sum_{j \neq k} \sum_{m=1}^{N} \gamma(n-m) G_m^{kj} S_m^j$$

$\gamma(m)$ denotes a coefficient of Inter-Carrier-Interference.

When the system is synchronized, $\gamma(m)=\gamma_0(m)=\delta(m)$ is a delta function, and the crosstalk for the $k^{th}$ subscriber line in the $n^{th}$ sub-carrier is $$I_n^k = \sum_{j \neq k} G_n^{kj} S_n^j,$$

i.e. there is no inter-carrier interference. When the system is unsynchronized, the coefficient of Inter-Carrier-Interference in the worst case can be expressed as follows:

$$\gamma(m) = \gamma_{IC1}(m) = \begin{cases} 1 & m = 0 \\ \dfrac{2}{N^2 \sin^2\left(\dfrac{\pi}{N} m\right)} & m \neq 0, -\dfrac{N}{2} \leq m \leq \dfrac{N}{2} \end{cases}$$

Here $\gamma_{ICI}(m)$ is symmetric and circular: $\gamma_{ICI}(m)=\gamma_{ICI}(-m)$ and $\Gamma_{ICI}(m)=\gamma_{ICI}(N-m)$.

By the use of Lagrangian, the above constrained problem as illustrated in formula (1) is changed to an unconstrained one as follows:

$$\sum_{k=1}^{K} \omega_k \sum_{n=1}^{N} \log\left(1 + \frac{G_n^{kk} S_n^k}{I_n^k + \sigma^2}\right) + \quad \text{Formula (2)}$$

$$\sum_{k=1}^{K} \lambda_k \left(P_k - \sum_{n=1}^{N} S_n^k\right) + \sum_{k=1}^{K} \sum_{n=1}^{N} \mu_n^k S_n^k$$

$\lambda_k$ and are $\mu_n^k$ are Lagrange Multipliers, the term $$\sum_{k=1}^{K} \lambda_k \left(P_k - \sum_{n=1}^{N} S_n^k\right)$$

denotes total power constraint $$\left(\sum_{n=1}^{N} S_n^k \leq P_k, \forall k\right),$$

and the term $$\sum_{k=1}^{K} \sum_{n=1}^{N} \mu_n^k S_n^k$$

denotes non-negative constraint of transmit power ($0 \leq S_n^k \ \forall k,n$). The problem as described in formula (2), which is equivalent to that described in formula (1), is still a non-convex problem, and has no efficient digital solution. A number of the first-order extremum points are present in the problem as described in formula (2), and each extremum point is a local optimal solution to this problem. The following formula can be resulted from a partial derivation of formula (2) with respect to $S_n^k$:

$$\frac{\omega_k}{S_n^k + \frac{I_n^k}{G_n^{kk}} + \frac{\sigma^2}{G_n^{kk}}} - t_n^k - \lambda_k + \mu_n^k = 0 \qquad \text{Formula (3)}$$

$$t_n^k = \sum_{j \neq k} \omega_j G_n^{jk} \sum_{m=1}^{N} \frac{\gamma(n-m) G_m^{jj} S_m^j}{(G_m^{jj} S_m^j + I_m^j + \sigma_m^j)(I_m^j + \sigma_m^j)} \qquad \text{Formula (4)}$$

$$I_n^k = \sum_{j \neq k} \sum_{m=1}^{N} \gamma(n-m) G_m^{kj} S_m^j \qquad \text{Formula (5)}$$

Assume that $t_n^k$ refers to a tax factor.

If a solution of $S_n^k$ can be obtained from formula (3) by a certain method, this solution is a local optimal solution. If the algorithm of this method is simple, the performance for the calculation can be improved greatly. Thus a local optimal solution to the problem as described in formula (2) is obtained with a simple algorithm.

Also, in addition to the formulae, the following constraint conditions also should be satisfied:

$$\begin{cases} \lambda_k \left( P_k - \sum_{n=1}^{N} S_n^k \right) = 0 \\ \mu_n^k S_n^k = 0 \\ P_k - \sum_{n=1}^{N} S_n^k \geq 0 \\ S_n^k \geq 0 \\ \lambda_k \geq 0 \\ \mu_n^k \geq 0 \end{cases} \qquad \text{Formula (6)}$$

Actually, formula (3) and formula (6) together constitute Karush-Kuhn-Tucher (KKT) conditions for the problem as described in formula (1), and it can be seen from the above that the conditions are essential in order to solve the problem as described in formula (1). It means that an optimal solution will certainly satisfy the conditions, but a solution that satisfies the conditions may be a local optimal solution, but not always an optimal solution.

The KKT conditions constituted by formula (3) and formula (6) can be further evolved into the following formula:

$$S_n^k = \left[ \frac{\omega_k}{\lambda_k + t_n^k} - \frac{I_n^k + \sigma_n^k}{G_n^{kk}} \right]^+, \forall n, k \qquad \text{Formula (7)}$$

$$\lambda_k \left( P_k - \sum_{n=1}^{N} S_n^k \right) = 0, \forall k \qquad \text{Formula (8)}$$

$$t_n^k = \sum_{j \neq k} \omega_j G_n^{jk} \sum_{m=1}^{N} \gamma(n-m) \frac{SINR_m^j}{G_m^{jj} S_m^j} \frac{SINR_m^j}{1 + SINR_m^j} \qquad \text{Formula (9)}$$

$[x]^+$ in formula (7) denotes max(0,x), which is equivalent to a Lagrangian multiplier $\mu_n^k$, and $\mu_n^k$ can be omitted in formula (7). In formula (9), $$SINR_m^j = \frac{G_m^{jj} S_m^j}{I_m^j + \sigma_m^j}$$

physically means signal-to-interference-noise ratio for $j^{th}$ user in $m^{th}$ carrier, and can be measured directly on a subscriber line.

For a single user, a conventional optimization water-filling algorithm can be expressed as follows:

$$\sum_{n=1}^{N} \log \left( 1 + \frac{G_n S_n}{\sigma^2} \right) + \lambda \left( P_k - \sum_{n=1}^{N} S_n \right),$$

a derivation of which with respect to $S_n$ results in the follows:

$$\frac{1}{\left( 1 + \frac{G_n S_n}{\sigma^2} \right)} \cdot \frac{G_n}{\sigma^2} - \lambda = 0,$$

which can be further simplified into the follows:

$$S_n = \left[ \frac{1}{\lambda} - \frac{\sigma_n}{G_n} \right]^+ \qquad \text{Formula (10a)}$$

$$SNR = \frac{G_n \cdot S_n}{\sigma^2}, \text{ and } \frac{1}{\lambda}$$

denotes a water level and is a constant for all sub-carriers of the same user.

A conventional iterative water-filling algorithm for a plurality of users is based on that for a single user, but the spectrums thereof can be updated as follows due to the crosstalk between the plurality of users:

$$S_n^k = \left[ \frac{1}{\lambda_k} - \frac{I_n^k + \sigma_n^k}{G_n^{kk}} \right]^+ \forall n, k \qquad \text{Formula (10b)}$$

The conventional multi-user iterative water-filling algorithm is described in detail as follows.

First process: for each user k, if spectrums of other users do not vary, $\lambda_k$ is obtained through the use of a conventional ordering algorithm, so that the power sum is $$\rho_k(\lambda_k) = \sum_{n=1}^{N} \left( \frac{1}{\lambda_k} - \frac{I_n^k + \sigma_n^k}{G_n^k} \right)^+ = P$$

Second process: $S_n$ of each sub-carrier is calculated from formula (10b), where n=1, 2, . . . , N.

Third step: the first and second steps are repeated for all the users until convergence is reached.

From a comparison of the single-user water-filling formula (10a), the conventional multi-user water-filling formula (10b), and the formula (7), it is easy to find out that both the single-user water-filling formula (when $t_n^k=0$ and $I_n^k=0$) and the conventional multi-user water-filling formula (when $t_n^k=0$) are specific cases of formula (7).

In order to solve formulas (7) and (8), a method of iterative modified water-filling needs to be used to obtain the transmit power spectrums of respective users. Specific steps of process 205 are as follows:

With given $t_n^k$, k=1, 2, ... K, n=1, 2, ... N, the following steps are performed for the current user k:

1. Define a power sum formula:

$$\rho(\lambda_k) = \sum_{n=1}^{N} \left[ \frac{\omega_k}{\lambda_k + t_n^k} - \frac{I_n^k + \sigma^2}{G_n^{kk}} \right]^+$$

2. If $\rho(0) \leq P_k$,
set $\lambda_k^* = 0$, $S_n^k = 0$, where n=1, 2, ..., N.

3. If $\rho(0) > P_k$, use a bi-section method to find optimal $\lambda_k$ and power spectrum:

3a) Initialize $\lambda_{k,min}$ and $\lambda_{k,max}$, so that $\rho(\lambda_{k,min}) > P_k$ and $\rho(\lambda_{k,max}) < P_k$;

3b) Repeat the following steps:

$$3b1) \text{ Calculate } \lambda_k = \frac{1}{2}(\lambda_{k,max} + \lambda_{k,min})$$

3b2) If $\rho(\lambda_k) > P_k$, then $\lambda_{k,min} = \lambda_k$
3b3) If $\rho(\lambda_k) < P_k$, then $\lambda_{k,max} = \lambda_k$
until $\lambda_k$ converges.

3c) From the formula (7) and the converging $\lambda_k$, $S_n^k$ of each sub-carrier for the current user is calculated, where n=1, 2, ..., N.

After the $\lambda_k$ has converged, the total power threshold for the current subscriber can be satisfied, and then process 202 is performed.

206: Update the tax factor:

The tax factor is calculated from the measured signal-to-inference-noise ratio and the calculation result of process 205, for which there may be the following three specific situations.

Scheme 1

With an update based upon a memoryless first-order optimization condition, the tax factor can be calculated from the following expression:

$$t_n^k = \sum_{j \neq k} \omega_j G_n^{jk} \sum_{m=1}^{N} \gamma(n-m) \frac{SINR_m^j}{G_m^{jj} S_m^j} \frac{SINR_m^j}{1 + SINR_m^j} \quad \text{Formula (11)}$$

This scheme is advantageous in that the update is simple, and that if the update converges, it will converge to a local optimal solution. However, this schema can not ensure convergence.

Scheme 2

The update is based upon a first-order optimization condition with memory, that is:

$$t_n^{k,\tau} = (1 - \alpha(\tau)) t_n^{k,\tau-1} + \quad \text{Formula (12)}$$
$$\alpha(\tau) \left( \sum_{j \neq k} \omega_j G_n^{jk} \sum_{m=1}^{N} \gamma(n-m) \frac{SINR_m^j}{G_m^{jj} S_m^j} \frac{SINR_m^j}{1 + SINR_m^j} \right)$$

$t_n^{k,\tau-1}$ denotes a tax factor at a previous time, $t_n^{k,\tau}$ denotes a tax factor at the current time, and $\tau$ is a time parameter. $\alpha(\tau)$ denotes a time-dependent memory parameter with a range of (0,1]. When $\alpha(\tau)=1$, formula (12) is changed to formula (11), that is to say, a memoryless update is a specific case of an update with memory. This scheme is advantageous in that the parameter $\alpha(\tau)$ can be determined appropriately (for example, to be inversely proportional to time) so that the tax factor will certainly converge. However, its drawback lies in that the converging tax factor may not satisfy the KKT conditions. That is, a sub-optimal solution, but not certainly a local optimal solution will be converged to in this scheme.

Scheme 3

The update is based upon the objective function (a weighted rate sum of all the users). The essential idea is that each update of the tax factor ensures an incremented value of the objective function. A specific schema is as follows.

(a) If at the current time, the power spectrum is $S^\tau$, the value of the objective function is $U^\tau$, and a tax factor not updated yet is $t^\tau$. A temporary tax factor $t^\tau$ can be calculated from formula (11) or formula (12).

(b) Corresponding temporary power spectrum S' and temporary value of the objective function are calculated further from the temporary tax factor.

(c) If $U' > U^\tau$, a tax factor at a next time is updated as $t^{\tau+1} = t'$, which is then transmitted, and the update is completed.

(d) If $U' < U^\tau$, the temporary tax factor is updated as $$t' = \frac{1}{2}(t' + t^\tau),$$

return to step (b).

The objective function is a weighted rate sum of all the users, i.e., $$U = \sum_{k=1}^{K} \omega_k \sum_{n=1}^{N} \log\left(1 + \frac{G_n^{kk} S_n^k}{I_n^k + \sigma_n^k}\right).$$

This schema is advantageous in that it ensures that the tax factor will converge to a local optical solution, and is disadvantageous in that it needs much more amount of calculations.

Any one of schemes 1 to 3 can be used to update a tax factor, dependent upon many factors such as real network topology, calculation capacity of the spectrum management center, and degree of the crosstalk actually suffered by the user In summary, a power spectrum distribution that satisfies formulas (7) to (9) can be found by combination of the update of the tax factor and the iterative modified water-filling. There may be numerous combinations for an iteration order, for example as follows.

Combination 1: First, tax factors for all the users are updated simultaneously, and then, the iterative modified water-filling is performed for all the users based upon a fixed tax factor. The process is repeated until convergence is reached.

$(t_n^1, \Lambda, t_n^K) \rightarrow (\lambda_1, S_n^1) \Lambda \rightarrow \Lambda (\lambda_K, S_n^K) \rightarrow (t_n^1, \Lambda, t_n^K) \rightarrow (\lambda_1, S_n^1) \rightarrow \Lambda$ Combination 2: A fax factor, a Lagrangian Multiplier, and a power spectrum are all updated for each user each time, which is repeated until convergence is reached.

$(t_n^1, \lambda_1, S_n^1) \rightarrow (t_n^2, \lambda_2, S_n^2) \rightarrow \Lambda \rightarrow (t_n^k, \lambda_K, S_n^K) \rightarrow (t_n^1, \lambda_1, S_n^1) \rightarrow \Lambda$ The algorithm for specific implementation of combination 1 will be described, which includes how to continuously update a tax factor as well as how to perform the iterative modified water-filling until convergence is reached in the case of a given tax factor. After the tax factor has converged, a transmit power spectrum of each user calculated from the iterative modified water-filling is just a local optimal solution for the problem as described in formula (1). The result of this solution is dependent upon the setting of an initial value for the tax factor.

The following steps are performed repeatedly for all the users:

$SINR_n^j$ of a line is measured or calculated, based on a result of the iterative modified water-filling, and corresponding $t_n^k$ is calculated from formula (11) or (12) or scheme 3.

The multi-user iterative modified water-filling is performed in accordance with the calculated $t_n^k$, until convergence is attained for all the users.

207: Determine whether the tax factor converges, and if so, go to step 208, otherwise go to step 202;

208: End.

With reference to FIG. 3, according to an embodiment, the spectrum optimization system includes:

a spectrum management center 301, a digital subscriber line access multiplexer 302, and a client device 303.

The spectrum management center 301 is used to set a tax factor, and to send the tax factor to the digital subscriber line access multiplexer 302.

The digital subscriber line access multiplexer 302 is used to calculate from the tax factor a corresponding water-filling parameter that corresponds to the case that the maximum total power for each user is below or equal to the total power threshold for that user, and used to calculate from the water-filling parameter the power allocated to each user in each sub-carrier until convergence is attained for all the users.

Alternatively, the power spectrum management center 301 is used to set a tax factor, and to send the tax factor to the digital subscriber line access multiplexer 302.

The digital subscriber line access multiplexer 302 is used to retransmit the tax factor to the client device 303.

The client device 303 is used to calculate from the tax factor a corresponding water-filling parameter that corresponds to the case that a maximum total power for each user is below or equal to a total power threshold for that user, and used to calculate from the water-filling parameter the power allocated to each user in each sub-carrier until convergence is attained for all the users.

Particularly, the spectrum management center 301 includes:

a collection unit 3011, an update unit 3012, and a transmission unit 3013.

The collection unit 3011 is used to obtain signal-to-interference-noise ratios, power spectrums, and relevant parameters of different users, and used to send the obtained parameters to the update unit 3012.

Particularly, the relevant parameters include transfer coefficients or some other necessary parameters, or do not include any other parameters.

The update unit 3012 is used to receive the parameters sent from the collection unit, update a factor in accordance with the parameters, and used to send the updated tax factor to the transmission unit 3013.

The transmission unit 3013 is used to transmit the received tax factor to the digital subscriber line access multiplexer 302.

In the case that the digital subscriber line access multiplexer 302 calculates the power allocation, after the power allocation is calculated for all the users, the digital subscriber line access multiplexer 302 sends the calculated or detected signal-to-interference-noise ratios to the spectrum management center 301.

In the case that the client device 303 calculates the power allocation, after the power allocation is calculated for all the users, the client device 303 sends the calculated or detected signal-to-interference-noise ratios to the spectrum management center 301 via the digital subscriber line access multiplexer 302.

The spectrum management center 301 sets a tax factor in accordance with the received signal-to-interference-noise ratio.

Particularly, the digital subscriber line access multiplexer 302 includes:

a spectrum management center sensor; which is used to set the tax factor as zero when the spectrum management center fails.

Specifically, the spectrum management center first sets tax factors that satisfy a preset condition, and distributes tax factors of users to their respective DSLAMs via a tax factor interface. If the iterative water-filling algorithm is performed in the client device, the DSLAMs distribute, through built-in channels between the DSLAMs and the client devices, the tax factors to the client devices where the users are located. The DSLAMs and/or client devices perform calculations in accordance with the tax factors, and when convergence is attained for all the users, the users upload respective signal-to-interference-noise ratios to the spectrum management center via SINR interfaces between the DSLAMs and the spectrum management center. The spectrum management center calculates new tax factors, and repeats the above procedure until convergence is reached.

With reference to FIG. 4, according to an embodiment, the client device 303 includes:

A tax factor reception unit 401, a water-filling unit 402, and a transmission unit 403.

The tax factor reception unit 401 is used to receive a tax factor; and to send the received tax factor to the water-filling unit 402.

The water-filling unit 402 is used to calculate from the received tax factor a corresponding water-filling parameter when total power of each user is below or equal to the total power threshold for that user, to calculate from the water-filling parameter the power allocated to each user in each sub-carrier until convergence is attained for all the users, and to send a calculation result to the transmission unit 403.

The transmission unit 403 is used to transmit the calculation result to the spectrum management center.

The dynamic power spectrum management method, the spectrum optimization system, and the client device according to embodiments of the present invention have been described in details as above, and the principle and the implementing modes of the present invention have been set forth with reference to their specific examples. In view of the essence of the present invention, variations and modifications can be made by those skilled in the art to the embodiments and the applications without departing the spirit and scope of the present invention, and the disclosure in this description shall not be construed to limit the scope of the present invention as defined in the appended claims.

What is claimed is:

1. A dynamic power spectrum management method, applied in a Digital Subscriber Line system which comprises a plurality of sub-carriers, comprising:

calculating, from a Lagrange Multiplier and a tax factor, a water-filling parameter of each user corresponding to the case that total power of the user is below or equal to a total power threshold for the user, wherein the tax factor bears user crosstalk information; and calculating, from the water-filling parameter, power allocated to each user in each sub-carrier, wherein the tax factor denotes:

influence on the user caused by interference from other users on each sub-carrier; and influence on a relative rate weight coefficient for the user;

transmitting the calculation result;

further comprising updating the tax factor of the user after calculating, from the water-filling parameter, the power allocated to each user in each sub-carrier, and wherein the power allocated to each user in each sub-carrier is dependent upon the power of other users in other sub-carriers;

and wherein updating the tax factor of each user comprises:

obtaining the value of a weighted rate sum of all users as a value of an objective function;

calculating a temporary tax factor, and calculating from the temporary tax factor a temporary value of the objective function; and comparing the value of the objective function with the temporary value of the objective function, and determining the tax factor based on a comparison result.

2. The dynamic power spectrum management method according to claim 1, further comprising setting the tax factor that satisfies a preset condition before calculating the water-filling parameter of each user corresponding to the case that the total power of the user is below or equal to the total power threshold of the user.

3. The dynamic power spectrum management method according to claim 1, wherein updating the tax factor of each user comprises:

calculating or measuring a signal-to-interference-noise ratio of each user in each sub-carrier; and calculating a corresponding tax factor from the signal-to-interference-noise ratios and the power allocated to each user in each sub-carrier.

4. The dynamic power spectrum management method according to claim 1, wherein updating the tax factor of each user comprises:

calculating or measuring a signal-to-interference-noise ratio of each user in each sub-carrier;

obtaining a memory parameter and a time parameter; and calculating a current tax factor from a tax factor at a previous time, the signal-to-interference-noise ratios and the power allocated to each user in each sub-carrier, using the memory parameter and the time parameter.

5. The dynamic power spectrum management method according to claim 3, wherein after updating the tax factor of each user, the method further comprises:

calculating, from the updated tax factor, the water-filling parameter corresponding to the case that the total power of each user is below or equal to the threshold of total power of the user; and calculating, from the water-filling parameter, the power allocated to each user in each sub-carrier until convergence is reached.

6. The dynamic power spectrum management method according to claim 4, wherein after updating the tax factor of each user, the method further comprises:

calculating, from the updated tax factor, the water-filling parameter corresponding to the case that the total power of each user is below or equal to the threshold of total power of the user; and calculating, from the water-filling parameter, the power allocated to each user in each sub-carrier until convergence is reached.

7. The dynamic power spectrum management method according to claim 1, wherein after updating the tax factor of each user, the method further comprises:

calculating, from the updated tax factor, the water-filling parameter corresponding to the case that the total power of each user is below or equal to the threshold of total power of the user; and calculating, from the water-filling parameter, the power allocated to each user in each sub-carrier until convergence is reached.

8. A spectrum optimization system, applied in a Digital Subscriber Line system which comprises a plurality of sub-carriers, comprising:

a spectrum management center, a digital subscriber line access multiplexer, and a client device, wherein the spectrum management center is adapted to set a Lagrange Multiplier and a tax factor, and to send the tax factor to the digital subscriber line access multiplexer, wherein the tax factor bear user crosstalk information, wherein the tax factor denotes: influence on the user caused by interference from other users on each sub-carrier and influence on a relative rate weight coefficient for the user, wherein the digital subscriber line access multiplexer is adapted to calculate, from the Lagrange Multiplier and the tax factor, a water-filling parameter corresponding to the case that total power of each user is below or equal to a total power threshold of the user, and to calculate, from the water-filling parameter, power allocated to each user in each sub-carrier until convergence is reached, wherein the client device is adapted to calculate, from the Lagrange Multiplier and the tax factor, a water-filling parameter corresponding to the case that total power of each user is below or equal to a total power threshold of the user, and to calculate, from the water-filling parameter, power allocated to each user in each sub-carrier until convergence is reached when the digital subscriber line access multiplexer re-transmits the tax factor to the client device;

wherein the client device is adapted to transmit the calculation result to the spectrum management center;

further comprising updating the tax factor of the user after calculating, from the water-filling parameter, the power allocated to each user in each sub-carrier, and wherein the power allocated to each user in each sub-carrier is dependent upon the power of other users in other sub-carriers;

and wherein updating the tax factor of each user comprises:

obtaining the value of a weighted rate sum of all users as a value of an objective function;

calculating a temporary tax factor, and calculating from the temporary tax factor a temporary value of the objective function; and comparing the value of the objective function with the temporary value of the objective function, and determining the tax factor based on a comparison result.

9. The spectrum optimization system according to claim 8, wherein the spectrum management center comprises:

a collection unit, an update unit, and a transmission unit, wherein the collection unit is adapted to obtain signal-to-inference-noise ratios, power spectrums, and relevant parameters of different users, and to send obtained parameters to the update unit, wherein the update unit is adapted to receive parameters sent from the collection unit, to update a tax factor in accordance with the parameters, and to send the updated tax factor to the transmission unit, and wherein the transmission unit is adapted to transmit the received tax factor to the digital subscriber line access multiplexer.

10. The spectrum optimization system according to claim 8,
wherein in the case that the digital subscriber line access multiplexer calculates power allocation, after the power allocation is calculated for all users, the digital subscriber line access multiplexer sends calculated or detected. signal-to-interference-noise ratios to the spectrum management center,
wherein in the case that the client device calculates power allocation, after the power allocation is calculated for all the users, the client device sends calculated or detected signal-to-interference-noise ratios to the spectrum management center via the digital subscriber line access multiplexer, and
wherein the spectrum management center sets the tax factor in accordance with received signal-to-interference-noise ratios.

11. The spectrum optimization system according to claim 10, wherein the digital subscriber line access multiplexer comprises a spectrum management center sensor, adapted to set the tax factor as zero when the spectrum management center fails, and wherein the power allocated to each user in each sub-carrier is dependent upon the power of other users in other sub-carriers.

12. The spectrum optimization system according to claim 9,
wherein in the case that the digital subscriber line access multiplexer calculates power allocation, after the power allocation is calculated for all users, the digital subscriber line access multiplexer sends calculated or detected signal-to-interference-noise ratios to the spectrum management center,
wherein in the case that the Client device calculates power allocation, after the power allocation is calculated for all the users, the client device sends calculated or detected signal-to-interference-noise ratios to the spectrum management center via the digital subscriber line access multiplexer, and
wherein the spectrum management center sets the tax factor in accordance with received signal-to-interference-noise ratios.

13. A client device, applied in a Digital Subscriber Line system which comprises a plurality of sub-carriers, comprising:
a tax factor reception unit, a water-filling unit, and a transmission unit,
wherein the tax factor reception unit is adapted to receive a Lagrange Multiplier and a tax factor, and to send the Lagrange Multiplier and the received tax factor to the water-filling unit, wherein the tax factor bear user crosstalk information, wherein the tax factor denotes: influence on the user from interference triggered by other users on each sub-carrier and influence on a relative rate weight coefficient for the user,
wherein the water-filling unit is adapted to calculate, from the received Lagrange Multiplier and tax factor, a water-filling parameter that corresponds to the case that total power of each user is below or equal to a total power threshold for that user, and to calculate, from the water-filling parameter, power allocated to each user in each sub-carrier, and to send a calculation result to the transmission unit,
wherein the transmission unit is adapted to transmit the calculation result to the spectrum management center;
further comprising updating the tax factor of the user after calculating, from the water-filling parameter, the power allocated to each user in each sub-carrier, and wherein the power allocated to each user in each sub-carrier is dependent upon the power of other users in other sub-carriers;
and wherein updating the tax factor of each user comprises:
obtaining the value of a weighted rate sum of all users as a value of an objective function;
calculating a temporary tax factor, and calculating from the temporary tax factor a temporary value of the objective function; and
comparing the value of the objective function with the temporary value of the objective function, and determining the tax factor based on a comparison result.

14. The client device according to claim 13, wherein after the spectrum management updates the tax factor, the water-filling unit calculates again, from the updated tax factor, the power allocated to each. user in each sub-carrier until convergence is reached, and wherein the power allocated to each user in each sub-carrier is dependent upon the power of other users in other sub-carriers.

* * * * *